(No Model.)  6 Sheets—Sheet 1.
C. R. AUSTIN.
MACHINE FOR CAPPING AND CRIMPING CANS.
No. 532,518.  Patented Jan. 15, 1895.

Fig. 1.

(No Model.) 6 Sheets—Sheet 2.
C. R. AUSTIN.
MACHINE FOR CAPPING AND CRIMPING CANS.
No. 532,518. Patented Jan. 15, 1895.

Fig. 2.

(No Model.)

C. R. AUSTIN.
MACHINE FOR CAPPING AND CRIMPING CANS.

No. 532,518. Patented Jan. 15, 1895.

Witnesses:
Inventor
Charles R. Austin
By James J. Sheehy
Attorney

(No Model.)  6 Sheets—Sheet 5.

C. R. AUSTIN.
MACHINE FOR CAPPING AND CRIMPING CANS.

No. 532,518.  Patented Jan. 15, 1895.

(No Model.) 6 Sheets—Sheet 6.
C. R. AUSTIN.
MACHINE FOR CAPPING AND CRIMPING CANS.
No. 532,518. Patented Jan. 15, 1895.

UNITED STATES PATENT OFFICE.

CHARLES ROSS AUSTIN, OF NEW WESTMINSTER, CANADA.

MACHINE FOR CAPPING AND CRIMPING CANS.

SPECIFICATION forming part of Letters Patent No. 532,518, dated January 15, 1895.

Application filed August 2, 1894. Serial No. 519,269. (No model.)

*To all whom it may concern:*

Be it known that I, CHARLES ROSS AUSTIN, a citizen of the Dominion of Canada, residing at New Westminster, in the county of Westminster and Province of British Columbia, Canada, have invented certain new and useful Improvements in Machines for Capping and Crimping Cans; and I do declare the following to be a full, clear, and exact description of the invention, such as will enable others skilled in the art to which it appertains to make and use the same.

My invention relates to improvements in machines for effecting the closure of cans; and it has for its general object to provide a can capping and crimping machine of a simple and practical construction, and one which is entirely automatic in its action and which is adapted to thoroughly cap and crimp a large number of cans in a short space of time.

Other objects and advantages of the invention will be fully understood from the following description and claims when taken in conjunction with the annexed drawings, in which—

In the said drawings, similar letters designate corresponding parts throughout the several views, referring to which—

A, indicates the main or base frame of my improved machine.

B, indicates the main, vertical shaft which may be driven by any suitable motor.

C, indicates the lower plate or table which is fixed on the shaft B, preferably by a set screw $a$, or other device which will permit of its being adjusted when desired; and D, indicates the upper plate or table which is designed to turn with the plate or table C, and is connected therewith, preferably by the screws $b$, and nuts $c$, which permit of the upper plate or table being adjusted to adapt the machine to cap and crimp cans of various heights or lengths.

Figure 1:
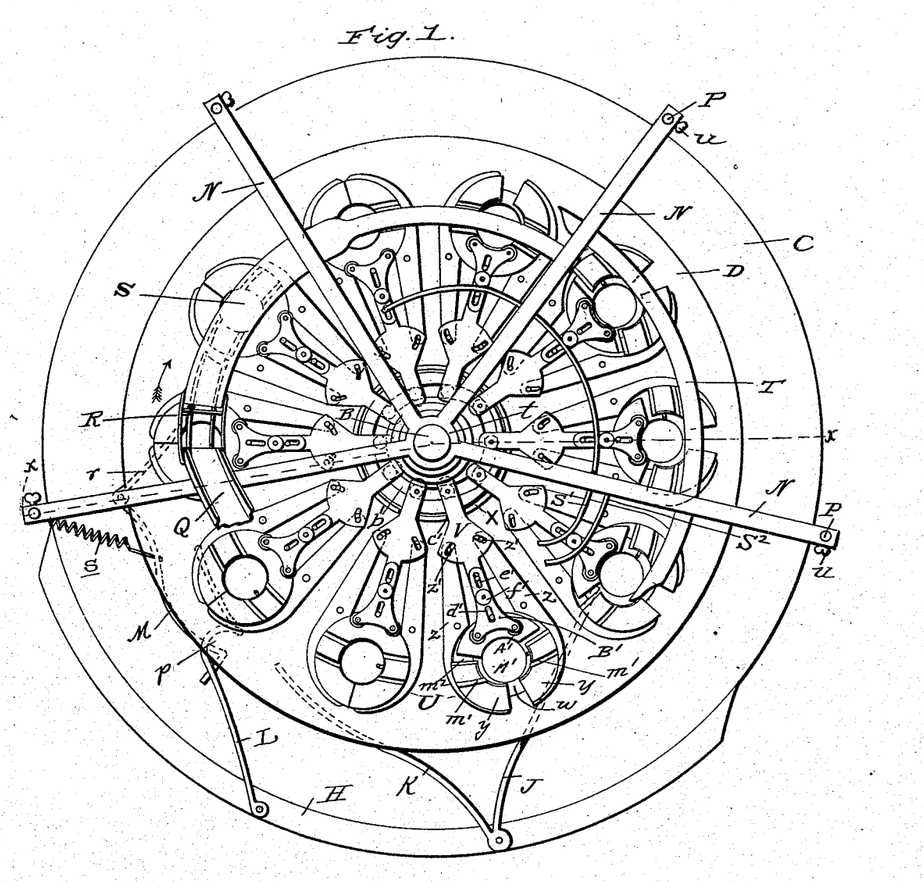
Figure 1, is a plan view of my improved machine.
Figure 2:
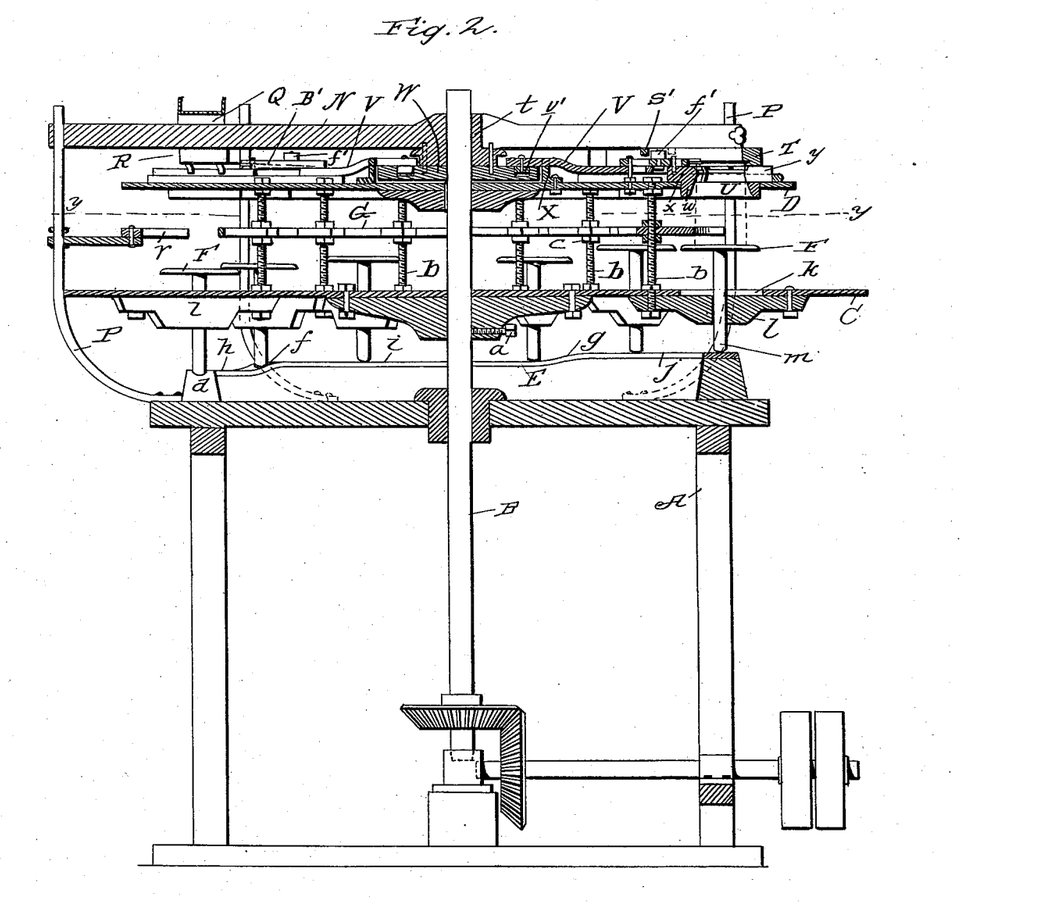
Fig. 2, is a vertical section taken in the plane indicated by the dotted line $x, x$, of Fig. 1.
Figure 3:
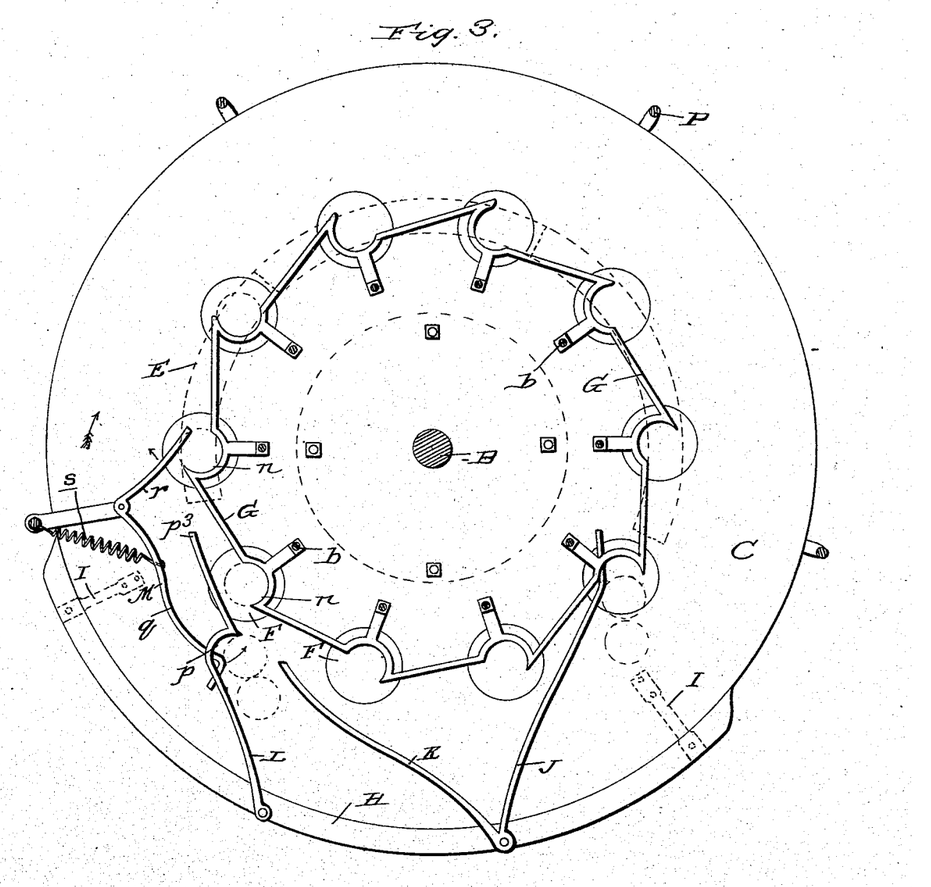
Fig. 3, is a horizontal section taken in the plane indicated by the line $y, y$, of Fig. 2.

The main or base frame A, is provided on its upper side (see Figs. 2, 3, 4, 5, 6, and 12,) with a circular or curvilinear track E, which has inclined planes $d$, $e$, at its forward and rear ends and also has the intermediate inclined planes $f$, $g$, and the three (more or less) flat surfaces $h$, $i$, and $j$, of various heights, and the table or plate C, is provided with a circular series of ten (more or less) circular apertures $k$, to seat the vertically movable platforms F, and with guides as $l$, for the depending stems $m$, of said platforms. These platforms F, are designed to support the cans to be capped and crimped, and their depending stems are designed to bear and travel upon the track E, as shown in Fig. 1, whereby it will be seen that when the plates or tables C, D, are turned in the direction indicated by arrow (see Fig. 1,) the platforms and the cans thereon will be successively raised to the positions shown in Figs. 4, 5, and 6, for a purpose presently described.

G, indicates the circular can carrier which is connected, preferably in an adjustable manner, to the bolts $b$, between the plates C, and D, and is provided with ten (more or less) seats $n$, to receive the cans; and H, indicates a marginal shelf or platform which is supported by bracket arms I, fixed on the frame A, and is therefore stationary. This marginal shelf or platform H, is preferably of the proportional length illustrated, and it is designed and adapted for the connection of the fixed arms J, K, and L. (See Fig. 3.) The arm J, which is fixedly connected at its outer end to the shelf or platform H, extends inwardly in a direction opposite to the direction in which the plates C, D, rotate, to a point within the path or orbit of the cans, and it is designed to automatically remove the capped and crimped cans from their seats in the carrier frame G. The arms K, and L, which are designed to form a feed way for the cans, are arranged in advance of the arm J, and extend inwardly in an opposite direction to the same. The arm K, of the feed way is preferably curved slightly as shown, and the arm L, is provided with a seat $p$, for the cans, which are moved from such seat into the seats $n$, of the carrier G, by the lever M, as will be presently described. This lever M, is fulcrumed in an arm extending inwardly from a stationary bracket arm presently described, and it has the portion $q$, designed to engage the cans and push the same out of the seat $p$, into the seats $n$, of the carrier; the portion $r$, designed to be engaged and moved by the cans on the platforms F, and the spring $s$, designed to return it to its normal position when it has been moved to discharge a can from the seat $p$.

N, indicates a series of horizontal bars which merge at their inner ends into a bearing $t$, for the shaft B, and are provided at their outer ends with apertures to receive the ends of the stationary bracket arms P, and with set screws $u$, whereby they may be fixed at various elevations on said bracket arms in conformity with the elevation of the table or plate D. These bars N, are arranged above the upper plate or table D, in the manner shown in Fig. 1, and they serve for the connection of the inclined chute Q, which guides the caps to position and is provided at its lower end with the parallel, curvilinear and beveled tracks R having the guides $R^7$, and the cross bar $R^8$, connecting said guides, the curvilinear plate S, which extends in advance of the tracks R, and is designed to prevent upward movement of the caps when the cans are pressed upwardly, the curvilinear crimping bar T, which extends in advance of the plate S, and the cam bars $S'$, $S^2$, which rest between the bar T, and the shaft B, as shown.

Figure 4:
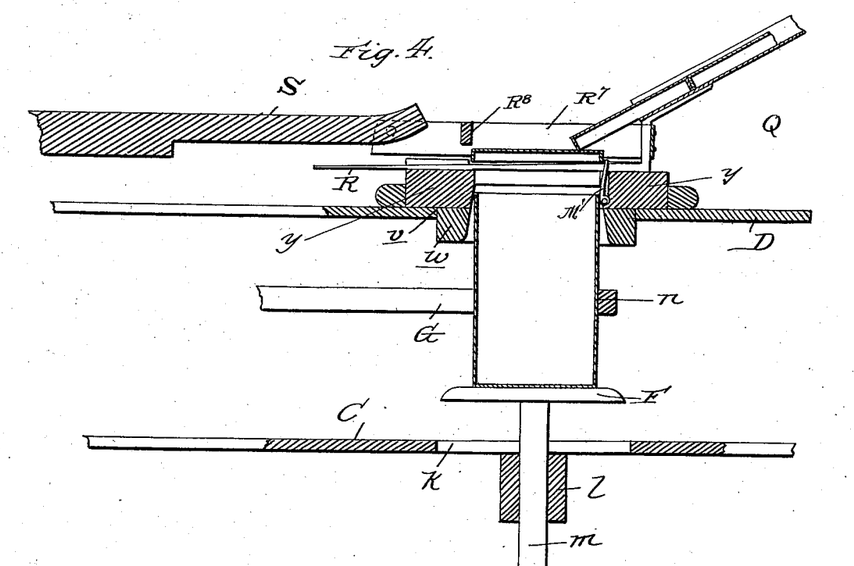
Figs. 4, 5, and 6, are detail sections, on an enlarged scale, illustrating the positions which certain parts of the machine are caused to assume to effect the capping of a can.

The cap chute Q, is preferably inclined at about the angle illustrated, and in practice the caps are placed thereon one above the other as illustrated in Fig. 4, so that when the first or lowermost cap drops upon the tracks R, the lower edge of the next cap will bear upon said first cap, and as the first cap is pushed along upon the tracks R, the second cap will move gradually downward until it assumes a horizontal position upon the tracks in rear of the first cap to be engaged by the lower edge of the third cap and so on; the cross bar $R^8$, of the guides $R^7$, serving as presently described to prevent any more than the cap that rests flat on the tracks R, from being removed or pushed along by the cap engaging device hereinafter described.

Figures 5, 6, 13:
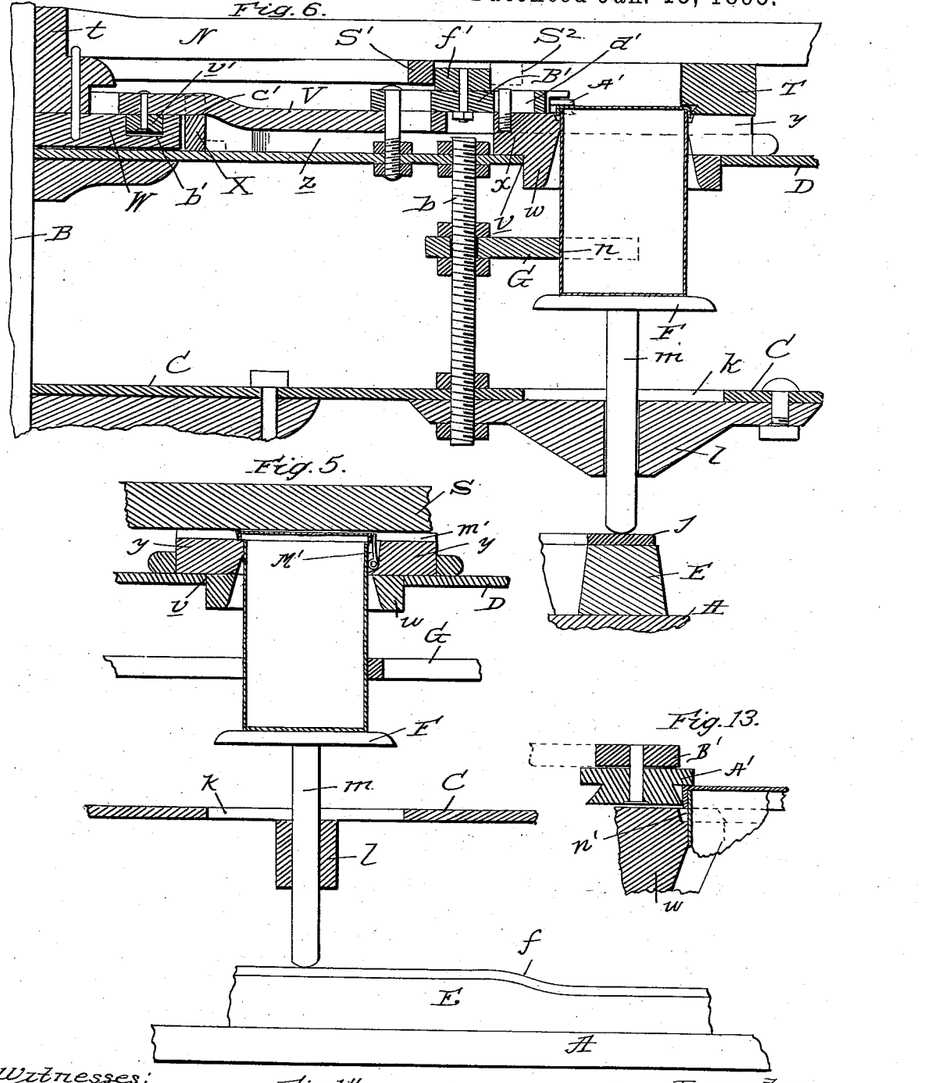
Fig. 13, is a detail section illustrating the shape of the crimping wheels.
Figures 7, 8, 9, 10, 11:
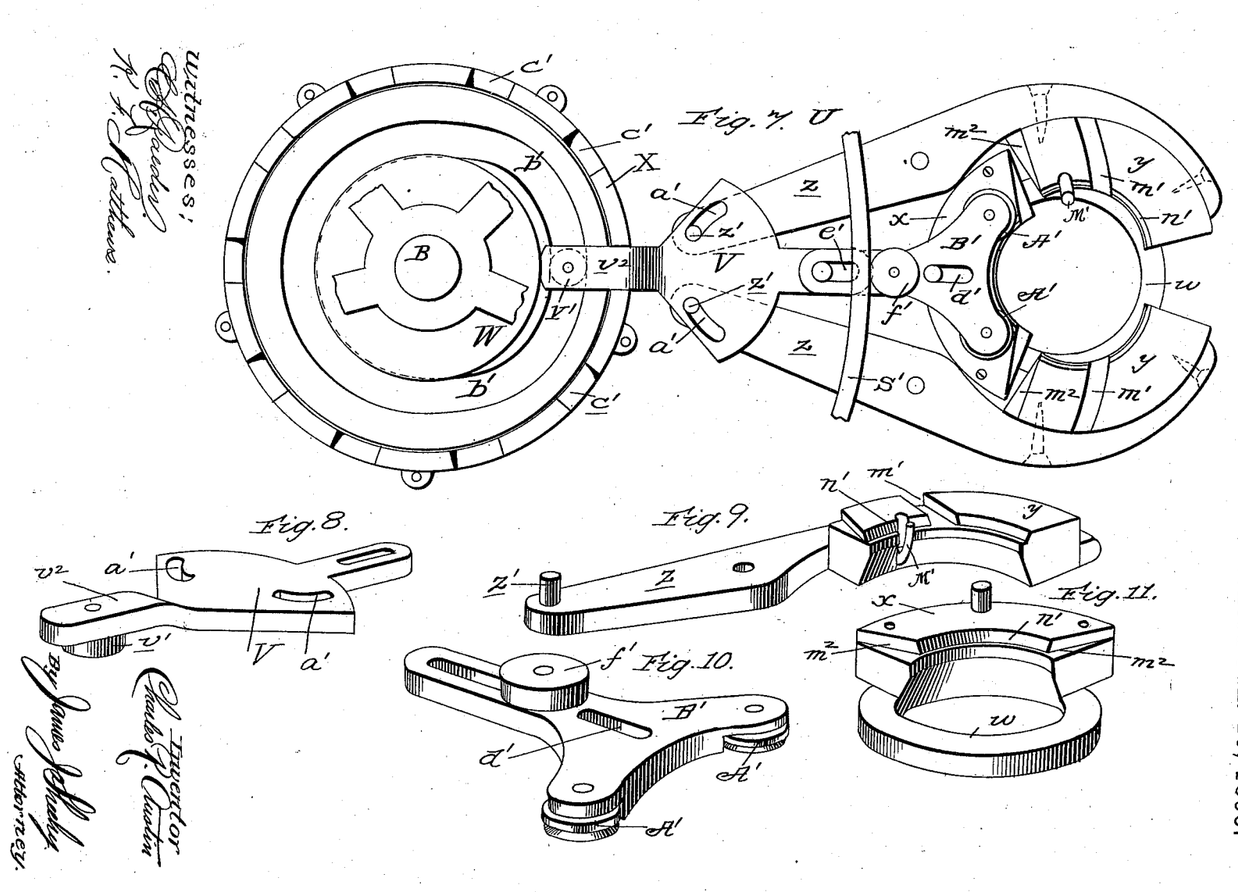
Fig. 7, is an enlarged, detail plan view illustrating one of the can holding and crimping devices and the mechanism through the medium of which the movable jaws of the holder are opened and closed and the crimper is actuated.
Figs. 8, 9, 10, and 11, are detail, perspective views of the several parts of the can holding and crimping devices.

The upper table or plate D, is provided at points above the platforms F, of the lower disk or plate C, with circular apertures $v$, and in the said apertures are secured annular bushings $w$, which have their inner sides beveled upwardly and inwardly as shown, to properly guide the cans in their upward movement and are preferably formed integral with the fixed sections $x$, of the can holders U, as better shown in Figs. 6 and 11. The said holders U, are radially disposed with respect to the shaft B, and they respectively comprise the fixed segmental section $x$, the movable segmental sections $y$, and the levers $z$, which carry the sections $y$. Said levers $z$, are fulcrumed at an intermediate point of their length upon the table or plate D, and they are provided at their inner ends with studs as $z'$, designed to be engaged by the slots $a'$, of the slides V, which slides are provided at their inner ends with gudgeons or rollers $v'$, for a purpose presently to be described.

X indicates an annular flange which is fixed on the table D, and has notches $c'$, to guide the shanks $v^2$, of the slides V, in their radial movements, and W, indicates the stationary cam which is connected in any approved manner with the bearing $t$, at the inner ends of the bars N. This cam W, has a groove $b'$, (see Figs. 2 and 7,) for the engagement of the gudgeons or rollers of the slides V, and the said groove is so formed and arranged that it will hold the sections $y$, of the can holders U, closed during the capping of the can, and will open said sections as the cans therein engage the crimping bar T, so as to permit the cans to turn or rotate between said bar T, and the crimping wheels as will be presently described.

$A'$, indicates the crimping wheels of which two are preferably employed on each holder U. These crimping wheels $A'$, are journaled in a plate or casting $B'$, as better shown in Fig. 7, and the said plate or casting is provided with slots $d'$, $e'$, to receive studs on the holder section $x$, and slide $v$, and is also provided with a roller or journal $f'$, designed to engage the cam bars S, $S'$, before described.

By reference to Figs. 7, 9, and 11, of the drawings, it will be perceived that the movable sections $y$, of the holders U, are provided with curvilinear grooves $m'$, and that the contiguous ends of the sections $x$, $y$, are so shaped that when the holders are closed grooves $m^2$, parallel to the grooves $m'$, will be formed between the fixed and movable sections, for a purpose presently described. It will also be perceived by reference to the drawings (more particularly Figs. 6 and 13,) that the holder sections $x$, $y$, are provided in their inner, upper corners with recesses $n'$, and that each of the rear holder sections $y$, is provided in its inner side with a vertical recess to receive a pivoted finger $M'$, the purpose of which will be presently set forth.

In operating my improved machine the upper table or plate D, and the bars N, should be adjusted vertically with respect to the lower table or plate C, and adjustably fixed to suit the length or height of the cans to be capped and crimped. When this has been done, the machine is set in motion; the shaft B, and the tables or plates C, D, being rotated in the direction indicated by the arrow. The operator who feeds the machine stands at the side of the shelf H, which serves to protect him, and places the cans between the arms K, and L; and as each can is removed from the seat $p$, of the arm L, the movement of the lower table or plate C, serves to crowd another can into such seat $p$. The cans are removed from the seat $p$, of the arm L, at regular intervals, by the lever M, which has its portion $r$, so arranged that it will be engaged and moved in the direction of the arrow (see Fig. 3,) by the can on each platform F, when the same takes upon the track E. When the portion $r$, of the lever M, is moved outwardly or in the direction indicated, the portion $q$, thereof, will be forced inwardly and will remove a can from the seat $p$, so that when the next seat $n$, of the carrier G, comes along, the can will be pressed between the said seat $n$, and the portion $p^3$, of the arm L, and will be caused to take its place in the seat $n$, and upon the platform F, beneath the same. The disks or plates C, D, continuing to rotate, the platform F, and the can thereon will be carried to the forward inclined end $d$, of the track E, and the stem of the platform traveling up the said end $d$, will raise the platform and the can thereon so as to force the upper end of the can between the sections of the holder U, which is closed at this point as shown in Fig. 4, and serves to reduce the upper end of the can should it happen to be too large and also serves to properly shape the can in case it is bent.

Figure 12:
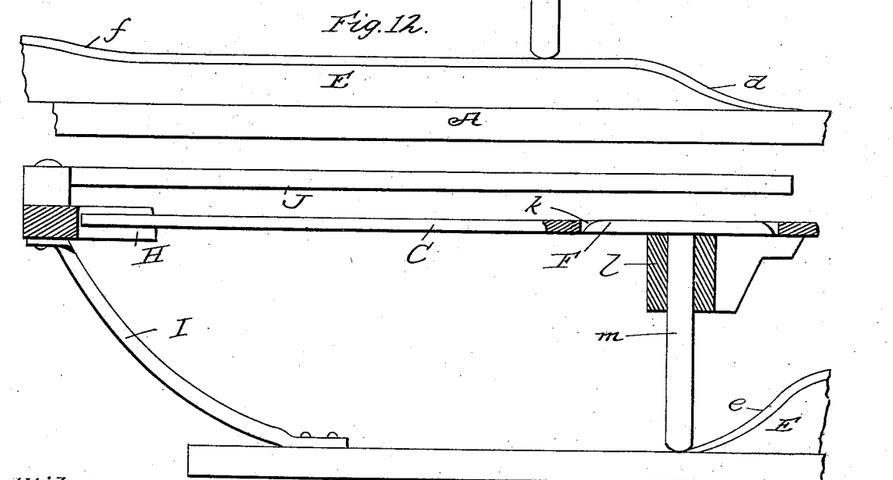
Fig. 12, is a detail section illustrating the position each can supporting platform assumes when it leaves the track E.
Figure 14:
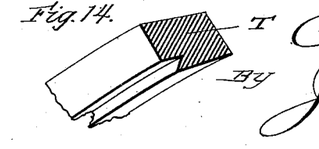
Fig. 14, is a detail, perspective section of a portion of the crimping bar.

The cap chute Q, and its tracks R, which engage the grooves $m'$, $m^2$, in the sections of the holders U, are so arranged that the caps will be deposited on the tracks R, and between the guides $R^7$, at a point above and slightly in advance of the beveled forward end $d$, of the track E, and consequently it will be seen that before each can comes beneath the cap on the tracks R, it (the can) will have been raised and will have raised the finger M', which normally rests in the path of the can and below the upper side of the holder sections into the position shown in Fig. 4, so as to enable said finger to engage the cap and push or carry the same along upon the tracks R, and beneath the bar or plate S; one end of which extends close to the chute Q, as shown. As the stem of the platform carrying the can travels along the first level $h$, of the track E, the cap engaged by the finger M', will be carried along the tracks R, which are beveled toward their free ends as shown so as to allow the cap to gradually move downwardly; and when the cap reaches the ends of the tracks it will drop into the recess $n'$, in the inner sides of the sections of the holder U. Immediately after the cap runs off the tracks R, and drops into the recess $n'$, the stem of the platform carrying the can will travel up the second incline $f$, of the track E, and the can will consequently be forced up into the cap which is held down by the bar or plate S, as shown in Fig. 5. When the stem of the platform travels up the third incline $g$, of the track and onto the level $j$, the can will be forced through the holder U, until the cap rests entirely above the sections of said holder as shown in Fig. 6, and at this time, the sections of the holder will be opened by the cam W, through the medium of the mechanism described so as to permit of the can being rotated. At this time, the can will be engaged on one side by the crimping bar T, which preferably has its inner edge shaped as shown in Fig. 14, and on its outer side by the wheels A', of the crimper on the holder U, which is forced outwardly and into engagement with the can by its wheel or gudgeon engaging the cam bar S'. (See Fig. 1.) By these devices it will be seen that the can will be rotated and thoroughly crimped, and as the can moves out of engagement with the bar T, the gudgeon of the crimper on the holder U, will be engaged by the cam bar $S^2$, and said crimper will consequently be drawn inward and out of engagement of the can. When the crimping operation is completed the stem of the platform carrying the can will travel down the inclined end $d$, of the track to its original position as shown in Fig. 12, and the capped and crimped can being engaged by the arm J, will be removed from its seat $n$, in the carrier G, and will be moved out of the machine by the movement of the lower table or plate C. After the can has been lowered from between the sections of the holder U, the cam W, through the medium of the mechanism described will close the sections of the holder so as to enable it to properly shape and reduce the size of the next can that is forced up into it.

I have specifically described the operation incidental to the capping and crimping of a single can, and this is believed to suffice since the cans in all the seats $n$, of the carrier G, and on all the platforms F, are manipulated in precisely the same manner.

The machine being continuous and entirely automatic in its action, it will be seen that it requires but one attendant, who may be unskilled since his only office is to place the can upon the table or plate C, between the arms K, L.

I have in some respects specifically described the construction and relative arrangement of the parts of my improved machine in order to impart a full, clear, and exact understanding of the same, but I do not desire to be understood as confining myself to such construction and arrangement as such changes or modifications may be made in practice as fairly fall within the scope of my invention.

The guides $R^7$, which are connected to the tracks R, as better shown in Fig. 4, are designed to guide the caps until they drop in the recesses in the holder section, and the cross bar $R^8$, with which said guides are provided, is designed and adapted to prevent any more than the cap that rests flat on the tracks R, from being removed or pushed along by the finger M'.

Having described my invention, what I claim is—

1. The combination with a rotary table and a can carrier arranged above and movable with the table; of an arm K, extending above the table to a point adjacent to the carrier, an arm L, extending above the table to a point adjacent to the carrier and having a seat $p$, and means for removing the cans from the seat $p$, of the arm L, substantially as specified.

2. The combination of a rotary table, a can carrier arranged above and movable with the table, an arm K, extending above the table to a point adjacent to the carrier, an arm L, extending above the table to a point adjacent to the carrier and having a seat $p$, a lever M, fulcrumed on a stationary support and adapted to be moved through the medium of the can carrier and means for returning said lever M, to its normal position, substantially as and for the purpose set forth.

3. The combination of a rotary table, a can carrier arranged above and movable with the table and having a plurality of seats to receive the cans, an arm J, extending above the table and intersecting the path of the carrier, an arm K, extending above the table to a point adjacent to the carrier, an arm L, extending above the table to a point adjacent to the carrier and having a seat $p$, a lever M, fulcrumed on a stationary support and adapted to be moved through the medium of the can carrier and means for returning said lever M, to its normal position, substantially as specified.

4. In a machine for capping cans, the combination of a rotary table having an opening to receive cans, an annular ring arranged in the opening in the table and having its inner side beveled upwardly and inwardly, a holder arranged upon the table around the opening therein and comprising a fixed section and movable sections, and a suitable means for opening and closing the movable sections of the holder, substantially as and for the purpose set forth.

5. In a machine for capping cans, the combination with a rotary table having an opening to receive a can, and a holder surrounding the opening of the table and comprising movable sections; of a central cam, and mechanism intermediate of the cam and the movable sections of the holder adapted to move said sections and open and close the holder, substantially as and for the purpose set forth.

6. In a machine for capping cans, the combination with a rotary table having an opening to receive a can and a holder surrounding the opening of the can and comprising movable sections and levers fulcrumed on the table and connected to the movable sections, a central stationary cam and a slide adapted to be actuated by said cam and engaging the levers, substantially as and for the purpose specified.

7. In a machine for capping and crimping cans, the combination of a rotary table having an opening to receive a can, a holder arranged upon the table around the opening and comprising movable sections, a suitable means for moving the sections of the holder to open and close the same, a slidable crimper arranged upon the holder and having a gudgeon or projection, a fixed or stationary crimper bar adapted to engage one side of a can, a cam bar S', adapted to engage the gudgeon or projection of the crimper and force it into engagement with the opposite side of the can, and a cam bar S², adapted to engage the gudgeon or projection of the crimper and move the same away from the can, substantially as and for the purpose set forth.

8. The combination of a rotary table adapted to receive and hold a can, a slidable crimper arranged upon the table and having a gudgeon or projection, a stationary crimper adapted to engage one side of a can, a stationary cam bar S', adapted to engage the gudgeon or projection of the crimper and force the same into engagement with the opposite side of the can, and a cam bar S², adapted to engage the gudgeon or projection of the crimper and move the same away from the can, substantially as specified.

9. The combination of a rotary table adapted to receive and hold a can, means for delivering caps upon said rotary table, and a finger carried by the table and adapted to engage the caps as they are fed so as to move them with the table, substantially as specified.

10. A rotary table adapted to receive and hold a can, and a device carried by the table and adapted to engage caps; in combination with a stationary cap chute arranged above the table and having tracks R, at its lower end, substantially as specified.

11. The combination of a rotary table having a holder to receive a can, a suitable means for raising a can into the holder, and a finger pivoted in the holder and adapted to be engaged and raised by the can when the same is pushed upwardly, substantially as specified.

12. The combination of an upper rotary table adapted to receive and hold a can and provided with a device adapted to engage caps, the curvilinear stationary plate arranged above said table, a cap chute arranged adjacent to the forward end of the plate and having tracks R, at its lower end, a lower table movable with the upper table, a vertically movable can supporting platform carried by the lower table, and a suitable means for raising said platform, substantially as specified.

13. The combination of a lower rotary table, screws $b$, connected to and rising from the lower table, an upper table movable with the lower table, and having apertures loosely receiving the screws $b$, and nuts mounted on the screws $b$, above and below the upper table, substantially as specified.

14. The combination of a lower rotary table, screws $b$, connected to and rising from the lower table, an upper table movable with the lower table and having apertures loosely receiving the screws $b$, nuts mounted on the screws $b$, above and below the upper table, a can carrier arranged between the upper and lower tables and having apertures receiving the screws $b$, and nuts mounted on the screws above and below the can carrier, substantially as and for the purpose set forth.

15. The combination of a rotary table adapted to receive and hold a can, a slidable crimper arranged upon the table and having a gudgeon or projection, a stationary crimper adapted to engage one side of a can, and a stationary cam bar S', adapted to engage the gudgeon or projection of the crimper and force the same into engagement with the opposite side of the can, substantially as specified.

16. The combination of a rotary table adapted to receive and hold a can, a slidable crimper arranged upon the table, and a stationary cam bar S', adapted to engage the slidable crimper and force the same into engagement with a can, substantially as specified.

17. A rotary table adapted to receive and hold a can, and provided with means for engaging caps, in combination with a stationary chute arranged above the table and having the tracks R, and guides $R^7$, at its lower end, and a cross bar connecting the guides, substantially as and for the purpose set forth.

18. A rotary table adapted to receive and hold a can and provided with means for engaging caps, in combination with a stationary chute arranged above the table and having the tracks R, at its lower end, substantially as and for the purpose set forth.

19. The combination of a rotary table having a holder to receive a can, a stationary chute arranged above the table and having tracks R, at its lower end, a suitable means for raising a can into the holder, and a finger pivoted in the holder and adapted to be engaged and raised by the can when the same is pushed upwardly, substantially as and for the purpose set forth.

20. The combination of a rotary table having a holder to receive a can, a suitable means for raising a can into the holder, and a cap engaging device arranged in the holder and adapted to be engaged and raised by the can when the same is pushed upwardly, substantially as specified.

21. A rotary table having a holder to receive a can, provided with grooves in its upper side, and a device carried by the table and adapted to engage caps; in combination with a cap chute having tracks R, at its lower end; the said tracks being adapted to rest in the grooves in the holder of the table, substantially as specified.

In testimony whereof I affix my signature in presence of two witnesses.

CHARLES ROSS AUSTIN.

Witnesses:
CHARLES SAMUEL KEITH,
H. J. A. BURNETT.